United States Patent
Granstrom et al.

[11] 3,921,671
[45] Nov. 25, 1975

[54] ELECTROMAGNETIC VALVE FOR MOLTEN METAL

[75] Inventors: Staffan Granstrom; Ingemar Goransson, both of Vasteras, Sweden

[73] Assignee: Allmanna Svenska Elektriska Aktiebolaget, Vasteras, Sweden

[22] Filed: Dec. 16, 1974

[21] Appl. No.: 533,185

[30] Foreign Application Priority Data
Dec. 19, 1973 Sweden............................ 7317209

[52] U.S. Cl. ................ 137/807; 137/340; 251/139
[51] Int. Cl.² .......................................... F15B 21/00
[58] Field of Search ........... 137/807, 825, 251, 340; 251/139

[56] References Cited
UNITED STATES PATENTS

| | | | |
|---|---|---|---|
| 3,028,874 | 4/1962 | Burkett.............................. | 137/340 |
| 3,052,253 | 9/1962 | Priaroggia........................ | 137/251 X |
| 3,463,365 | 8/1969 | Dumont-Fillon................ | 137/251 X |
| 3,485,254 | 12/1969 | Ernst................................ | 137/251 X |
| 3,587,613 | 6/1971 | Mark ............................... | 137/807 X |

Primary Examiner—Harold W. Weakley
Attorney, Agent, or Firm—Kenyon & Kenyon Reilly Carr & Chapin

[57] ABSTRACT

An electromagnetic valve for molten metal has means for forming a magnetic flux field transversely across the hole of a refractory nozzle through which molten metal can flow, and two electrodes extend through the nozzle transversely with respect to the hole and that flux field, the electrodes having cooling means and being made at least mainly of copper, each electrode having an inner end contacted by the metal for passing a current through the metal and thereby controlling the metal flow through the nozzle hole. Each electrode's inner end is protected by a composite cladding formed by an inner layer that is, like the electrode, mainly copper, and an outer layer of a metal that is more wear-resistant, but less heat-conductive, than the inner layer, the two layers of the cladding being weld-bonded together so that they are inseparable. The inner layer having the same or substantially the same composition as the electrode, is fixed to the electrode by a film of solder which is protected from the heat of the metal, by the rapid transfer of this heat to the electrode having the cooling means, the solder film being sandwiched between the electrode and inner layer of the cladding, both of which are mainly copper and, therefore, of high heat conductivity.

5 Claims, 3 Drawing Figures

ELECTROMAGNETIC VALVE FOR MOLTEN METAL

BACKGROUND OF THE INVENTION

The technology of the electromagnetic valves for controlling the flow of molten metal is explained in substantial detail by British Patent specification 1,281,377, published July 12, 1972. Therefore, this reference is incorporated into the present disclosure and made a part thereof.

However, such technology is not needed in that detail to understand the problem which the present invention is intended to solve.

For such understanding it is only necessary to know that an electromagnetic valve comprises a refractory body, forming a hole through which the molten metal can flow. For example, this body may form the teeming nozzle of a ladle containing a metal melt which, for casting, must be teemed under control permitting stoppage of the flow or a variation in flow rate, or at may form the tap hole in a furnace containing a metal melt.

For the valve action, there is a means for forming a magnetic flux field transversely across the hole and, therefore, through a metal in the hole, the valving action being effected by passing current through a metal in a direction transversely with respect to the flux field, normally at right angles to the flux field. Depending on the strength of the flux field and of the current, and the polarity involved, the flow of metal through the hole can be stopped or controlled as to rate of flow. The operation may be either DC or AC, providing that if AC is involved, proper phasing is observed, the means for providing the flux field normally being a solenoid with a suitable magnetic core providing pole pieces positioned relative to the refractory body hole to form what would be, in effect, an air gap in the absence of metal in the hole. Therefore, it follows that such means for providing the magnetic flux field does not need to be contacted by the molten metal because the flux can pass through the refractory body without requiring contact by the metal.

However, the two electrodes used for passing the current through the metal must, of course, be in electrical contact with the metal and, therefore, exposed to wear and erosion by the metal while it flows through the hole when the valve is, in effect, open.

The electrodes are at least mainly copper in the sense that they are made of copper or copper alloy providing high conductivity both electrically and thermally. For protection against the heat they receive from the metal, they are provided with cooling means, the electrodes normally being formed in the passages through which a fluid coolant, such as water, is constantly passed while the valve is in operation.

To protect the inner ends of these electrodes, exposed to the metal flow, it is natural to suggest that these ends be clad with a metal that is effectively more wear-resistant than the copper or copper alloy from which the electrodes are made. For example, an austenitic stainless steel or other non-magnetic steel might very well be considered.

However, when such cladding becomes worn excessively, which is inevitable regardless of its wear-resisting character, the cladding should be capable of removal and replacement by new cladding. This, in turn, suggests that the cladding be fixed to the electrodes by, for example, the use of soldered connections.

Unfortunately, the use of solder involved the problem that two materials such as the copper or copper alloy of each electrode and the austenitic stainless steel cladding, having differing thermal conductivities, produces a risk of porosity and slag in the solder film. Oxidation effects are involved so that the heat transfer capacity of the solder film is reduced, involving the risk that the cooling of the solder film by the cooled electrode is reduced with consequent risk of fusion of the solder film. Furthermore, the heat cannot be removed from the stainless steel as rapidly as it is removed from the electrode by its coolant, this resulting in the solder film operating under high thermal stress because of the temperature differences of the two parts the solder is required to fix together.

The foregoing shows that the use of soldered-on cladding for protecting the inner end of an electrode operating under the conditions described, has heretofore presented a problem.

SUMMARY OF THE INVENTION

The object of the present invention is to provide a solution to the above problem.

Briefly stated, this is done by using a composite or bi-metal cladding comprising an outer layer of the austenitic stainless steel or other metal that is more wear-resistant than the copper or copper alloy but less heat conductive than such material, and an inner layer that is mainly copper, preferably the same copper or copper alloy composition as that of the electrode, the two layers being weld-bonded together. The technology of weld-bonding stainless steel and copper or copper alloy layers together, is well-known, for example, by pressing the two layers together under the protection of an argon atmosphere and at temperatures sufficient to effect inter-alloying of the two layers. By the use of adequate precautions and pre-conditioning of the two layers, they can be welded together so as to become inseparable under elevated temperature service conditions.

This composite or bi-metal cladding is then soldered to the inner end of each of the electromagnetic valve electrodes, preferably using a silver solder sometimes called a silver brazing alloy. Ternary alloys of silver, copper and zinc in varying proportions have been used for many years as brazing alloys and then, industrially, they are usually called silver solders. Such a silver solder has been used extensively in interconnecting copper and copper alloy parts.

The strongest joint that can be made with silver solder, between copper and copper alloy parts, is made when a very small clearance is involved. Therefore, in the case of the present invention the interfaces of the inner electrode ends and of the copper or copper alloy layers of the claddings are made as smooth as possible, as by machining the surfaces to be joined by the silver solder films formed between these surfaces. Using good silver soldering practices, each silver solder film is very thin, is substantially free from porosity, oxide inclusions, and in general, completely free from the problems involved by any attempt to silver solder a stainless steel part to a copper or copper alloy part.

An electromagnetic valve, when using electrodes with their inner ends clad as described above, has among others, the following advantages.

The silver solder film bonding the cladding to the electrode, in each instance, provides a firm connection of high thermal conductivity, the two layers of the cladding, being weld-bonded together and inter-alloyed by this bonding, being inseparably joined together.

The solder film bonding the cladding to the electrode is sandwiched between the electrode and the inner layer of the cladding, both being of high thermal conductivity and with the film itself being of high thermal conductivity, assuring the abstraction of heat from the silver solder film, at a rate adequate to prevent fusion of this film and, therefore, preserving the integrity of the connection between the cladding and the electrode.

The temperature gradients on both sides of the soldered film are substantially the same because the bonding solder film is sandwiched between two metals of the same or substantially the same thermal conductivity.

Because the inner layer of the bi-metal cladding may have the same composition as does the mainly copper or all copper electrode, the silver solder connection can be effected easily with the bond thus formed being of high strength and, of course, high thermal conductivity, the silver solder comprising largely silver and copper, both metals of high thermal conductivity.

BRIEF DESCRIPTION OF THE DRAWINGS

The presently preferred mode for carrying out the invention is illustrated by the accompanying drawings, in which.

DETAILED DESCRIPTION OF THE INVENTION

Figure 3:
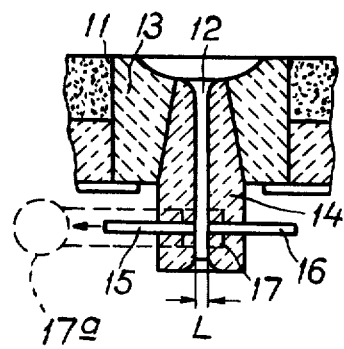
FIG. 3 is a vertical section through a teeming nozzle provided with the electromagnetic valve, and which is included to show the positions of the electrodes.

Having reference first to FIG. 3, the bottom 11 of, for example, a ladle containing molten metal, steel being an example, is shown with a teeming hole 12 extending downwardly; a nozzle stone 13 mounting the nozzle 14 in which this hole 12 is formed, all of the parts just referred to being made of refractory material. The two electrodes 15 and 16 are shown with their inner ends oppositely spaced and the electrodes substantially aligned transversely with respect to the hole 12, the current path length being indicated at L. At right angles to the transverse arrangement of the electrodes 15 and 16, one of the pole pieces 17 is shown which, as energized by a solenoid 17a generally indicated by broken lines, provides with the unillustrated other pole piece the magnetic flux across the hole 12. As previously indicated, it is unnecessary to describe the details of the technology involved by the valve action, to show that the inners end of the electrodes 15 and 16 are subjected to the wear of the molten metal through the hole 12 in the nozzle 14, and, of course, due to erosion resulting when this valve is in its, in effect, closed condition. Plainly, the inner ends of the electrodes 15 are subjected to wear and erosion.

Figure 1:
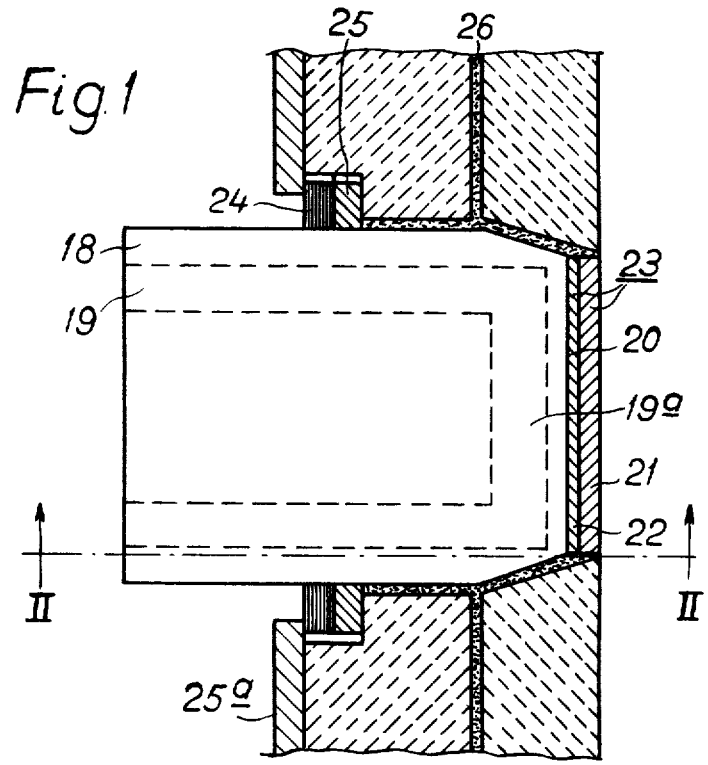
FIG. 1 is a vertical section through one wall of the teeming nozzle of, for example, a ladle containing the melt, and showing one of the new electrodes.
Figure 2:
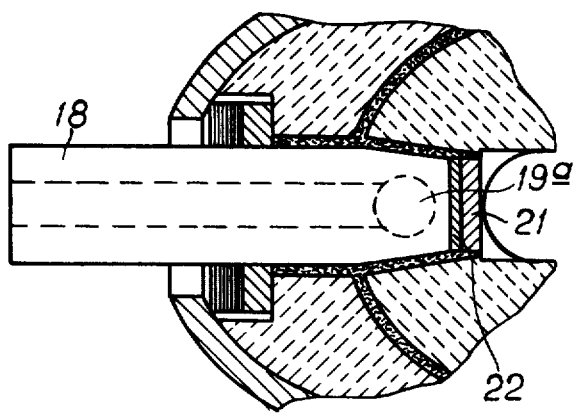
FIG. 2 is a cross section taken substantially on the line II—II in FIG. 1.

Referring next to FIGS. 1 and 2, one of the electrodes is shown at 18, this being a relatively massive body of copper which is vertically elongated and extends from outside of the nozzle for connection to the electric power, to the inside where the electrode's inner end must be contacted by the molten metal. The cladding is generally indicated at 23, it comprising an inner layer 22 of copper and an outer layer 21 of austenitic stainless steel, the two layers being firmly interbonded by a weld-bond effected by temperature and pressure and resulting in inter-alloying of the two layers, the resulting bond being substantially impervious to all temperatures below the melting temperature of the two layers.

The silver solder or brazed connection is shown at 20, this being a very thin film of silver solder or brazing material. Assuming the inner end of the electrode 18 to have a substantially completely flat surface, the inner surface of the cladding 22 may advisably be also made completely flat by machining, keeping in mind that during the bond-welding of the layers 21 and 22, there may be some distortion, removed advisably by machining.

The electrode 18 has the water coolant passage 19 formed in it for circulation of such a fluid coolant, and this is formed with a transverse passage 19a which traverses very closely to the surface of the inner end of the electrode 18 and, therefore, very close to the solder film 20 which bonds the cladding 23 to the electrode's inner end. Usually the refractory used in making a teeming nozzle, in general, is a dense refractory of relatively high heat conductivity. Therefore, as shown by the drawings, a less dense refractory spaces the nozzle and the cladding from such refractory, this being shown at 26.

The electrode 18 is shown as having a flange 25 pressed against the outer layer of refractory, separated from the inner layer by the material 26 and clamped in position by an inwardly extending outer flange 25a, through the medium of an interposed gasket 25 which may be made of a relatively dense asbestos material, such as so-called asbestos wood. The forward end of the electrode is tapered so that with this arrangement forward motion of the electrode is limited, the tapered portion fitting on the inner wall of the refractory separated from the outer wall by the refractory cement 26.

During operation, the valve operates electromagnetically in its usual way.

However, with the inner end of each electrode protected by the cladding 23, the inside face of the latter being flush with the inside of the refractory body in which the electrode is mounted, it is, of course, this face protected by the outer layer 21 of austenitic stainless steel, that accepts the wear and erosion of the molten metal.

The bond between this outer layer of the austenitic stainless steel 21 and the inner layer 22 of copper is, of course, resistant to the temperatures involved. The bond is a weld-bond wherein the copper and the stainless steel components are to some extent allowed with each other, the bond being substantially inseparable.

The silver solder film 20 bonding the cladding 23 to the inner end of the electrode 18 is sandwiched between the two copper components of high thermal conductivity. The silver solder film itself is of high thermal conductivity. Thermally, the effect is somewhat like the copper electrode itself being directly bonded to the stainless steel outer layer of the cladding. There is substantially no temperature grading across the silver solder film 20. Because this film is formed between two copper parts of the same or substantially the same composition, it can be formed free from inclusions, oxides or other discontinuities. The heat removal effected by the coolant in the passage 19, and particularly its portion 19a, removes the heat from the solder film and the copper layer 22 at substantially the same rate, protecting the solder film 20 against fusion and thermal stressing.

The total thickness of the cladding 23 may be in the area of 7 to 8 mm, as the cladding would be applied to the electrodes of an electromagnetic valve of conventional size and capacity. Admittedly, the weakest point in the connection between the stainless steel layer 21 and the electrode, is the silver solder bonding film 20, but this is located very close to the coolant passage 19a, the thermal conductive path being, in effect, from the copper layer 22 through the silver solder film 20 and the copper of the electrode 18, directly to the water coolant in the passage 19a which traverses very close to or adjacently to the solder film 20. The rate of heat abstraction can be made easily adequate to remove the heat at a rate preventing fusion of the solder film 20 during the operation of a valve using the electrodes of the present invention.

Before closing, it might be mentioned that in the previously referred to British patent specification, the current is applied to the metal by way of the metal being in the channel of a channel-type induction furnace, the operation, therefore, necessarily being AC with the solenoid for the pole piece of the magnetic flux creating means, being powered by current having the same phase as that of the furnace inductor. In the present instance, the electrodes are used to transmit the current through the metal. Therefore, if AC operation is involved, these electrodes must be powered by current properly phased relative to that energizing the solenoid providing the flux field. However, the present invention is entirely concerned with protecting the electrodes which must be used to pass the current through the metal when this current is not supplied by the inductor of a channel-type furnace.

What is claimed is:

1. An electromagnetic valve for molten metal, comprising a refractory body forming a hole through which said metal can flow, means for forming a magnetic flux field transversely across said hole, and two electrodes extending through said body transversely with respect to said hole and said flux field, said electrodes having cooling means and being made at least mainly of copper and each electrode having an inner end contacted by said metal and protected by a composite cladding formed by an inner layer that is at least mainly copper and an outer layer that is a metal more wear-resistant but less heat-conductive than said inner layer, said layers being weld-bonded together and said inner layer being fixed to said electrode by a film of solder.

2. The valve of claim 1 in which said metal of said outer layer of said cladding, is a non-magnetic steel.

3. The valve of claim 1 in which said cooling means are formed by fluid-coolant passages in said electrodes and having portions extending adjacent to said film of solder and which remove heat conducted to said film through said cladding from said metal, at a rate preventing fusion of said film of solder.

4. The valve of claim 3 in which said solder is silver solder.

5. The valve of claim 1 in which each of said electrodes are spaced from said refractory body by a layer of material of lower heat-conductivity than that of said refractory body.

* * * * *